United States Patent
Banerjee et al.

(10) Patent No.: US 7,188,071 B2
(45) Date of Patent: Mar. 6, 2007

(54) APPARATUS AND METHODS FOR PROVIDING FINE GRANULARITY ALERTING TO CUSTOMERS

(75) Inventors: Dwip N. Banerjee, Austin, TX (US); Michael Wayne Brown, Georgetown, TX (US); Rabindranath Dutta, Austin, TX (US); Kumar Ravi, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1270 days.

(21) Appl. No.: 09/961,898

(22) Filed: Sep. 24, 2001

(65) Prior Publication Data

US 2003/0061109 A1    Mar. 27, 2003

(51) Int. Cl.
*G06Q 99/00*    (2006.01)
(52) U.S. Cl. ............................................. 705/1
(58) Field of Classification Search ............ 705/1, 705/400

See application file for complete search history.

(56) References Cited

U.S. PATENT DOCUMENTS

| | | | | |
|---|---|---|---|---|
| 6,026,375 | A * | 2/2000 | Hall et al. | 705/26 |
| 6,324,476 | B1 * | 11/2001 | Trovato | 701/301 |
| 6,926,203 | B1 * | 8/2005 | Sehr | 235/492 |
| 2002/0077876 | A1 * | 6/2002 | O'Meara et al. | 705/8 |
| 2003/0195698 | A1 * | 10/2003 | Jones | 701/201 |

FOREIGN PATENT DOCUMENTS

WO    WO 9427264 A1 * 11/1994

OTHER PUBLICATIONS

Marsh, Christy, Pizzamaker's art, high-tech combine at Papa John's, Jan. 3, 1996, Kansas City Star, p. 12.*
Donker, Peter P, Zoots hopes to wear well in Worcester, Nov. 10, 1999, Telegram & Gazette, Worchester Mass: Page E.*

* cited by examiner

*Primary Examiner*—John Weiss
*Assistant Examiner*—Jamisue Webb
(74) *Attorney, Agent, or Firm*—Duke W. Yee; Marilyn Smith Dawkins; Theodore D. Fay, III

(57) ABSTRACT

Apparatus and methods for providing a fine granularity alerting mechanism for alerting customers of the status of an order are provided. With the apparatus and methods, a customer selects a supplier of a good or service and places an order with the supplier. Upon submitting the order to the supplier, a session between the supplier and the customer is initiated such that the customer may be provided with one or more alerts of the current status of the customer's order. The one or more alerts may be periodic or may be based on the occurrence of one or more certain events. The alerts may include an estimated time of travel from a customer's current location to a location at which the order is to be completed along with an estimated time of completion of the order. In one embodiment, if the estimated time of travel from the customer's current location to the completion location is the same or within a certain tolerance of the estimated time of completion of the order, an alert is transmitted to the customer indicating that the customer should begin traveling to the completion location. In another embodiment, the alerts may include an estimated cost of the order based on a base cost for the product or service ordered as well as incremental costs for delay on the part of the customer for completion of the order.

2 Claims, 4 Drawing Sheets

US 7,188,071 B2

APPARATUS AND METHODS FOR PROVIDING FINE GRANULARITY ALERTING TO CUSTOMERS

RELATED APPLICATION

This application is related to commonly assigned and co-pending U.S. patent application Ser. No. 09/788,059 entitled "APPARATUS AND METHODS FOR PROVIDING AN ESTIMATED TIME OF ARRIVAL BASED MARKETPLACE," filed on Feb. 16, 2001, which is hereby incorporated by reference.

BACKGROUND OF THE INVENTION

1. Technical Field

The present invention is directed to an improved distributed computer system. More particularly, the present invention provides apparatus and methods for providing fine granularity alerting to customers.

2. Description of Related Art

Electronic marketplaces on the Internet are becoming more prevalent. These electronic marketplaces provide a central location through which goods and service providers may be accessed. Through these electronic marketplaces, a user may place orders for goods and services and may obtain information about the goods and service providers, and the goods and services provided.

With many electronic marketplaces, when a customer submits an order, a generic estimate is provided as to when the order will be completed. For example, a marketplace may inform a customer that it takes between 3 and 5 business days to complete and ship the order. In other marketplaces, a customer may periodically log onto the marketplace to obtain an update of the current status of the customer's order.

The known systems, however, do not provide a mechanism for providing fine granularity alerts to customers based on the current status of the customer's order and the current location of the customer. In other words, the known systems do not provide the customer with alerts giving the customer an indication of when the customer should begin traveling from the customer's current location to a location where the order is to be completed.

Thus, it would be beneficial to have apparatus and methods for providing fine granularity alerts to customers to thereby provide them with an indication as to when they should begin traveling to a location where the order is to be completed.

SUMMARY OF THE INVENTION

The present invention provides apparatus and methods for providing a fine granularity alerting mechanism for alerting customers of the status of an order. With the present invention, a customer selects a supplier of a good or service and places an order with the supplier. Upon submitting the order to the supplier, the present invention initiates a session between the supplier and the customer such that the customer may be provided with one or more alerts of the current status of the customer's order.

The one or more alerts may be periodic or may be based on the occurrence of one or more certain events. The alerts may include an estimated time of travel from a customer's current location to a location at which the order is to be completed (hereafter referred to as the completion location) along with an estimated time of completion of the order. In one embodiment, if the estimated time of travel from the customer's current location to the completion location is the same or within a certain tolerance of the estimated time of completion of the order, an alert is transmitted to the customer indicating that the customer should begin traveling to the completion location.

In another embodiment of the present invention, the alerts may include an estimated cost of the order based on a base cost for the product or service ordered as well as incremental costs for delay on the part of the customer for completion of the order. For example, a base cost of $10.00 may be charged for the order, but for each additional increment of 5 minutes that the customer delays in completing the order, the customer is charged an additional 3 cents.

Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
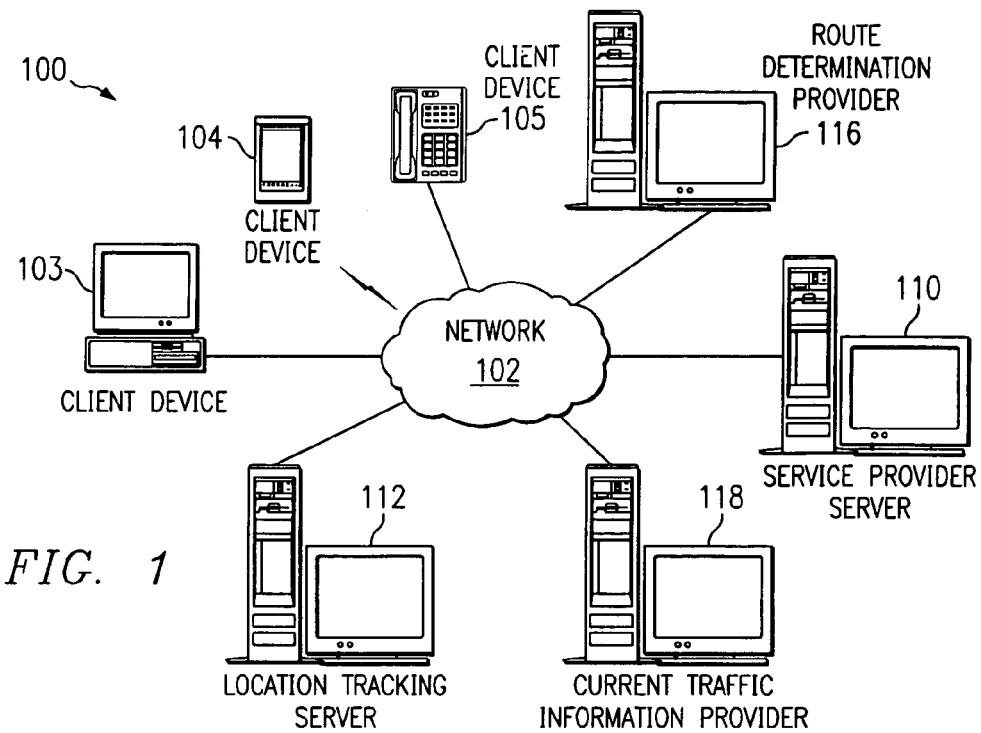
FIG. 1 is an exemplary block diagram illustrating a network data processing system according to one embodiment of the present invention.

FIG. 1 is an exemplary block diagram of a distributed data processing system according to the present invention. As shown in FIG. 1, the distributed data processing system 100 includes one or more client devices 103–105 coupled to a network 102. In addition, servers 110, 112, 116 and 118 are coupled to the network 102. The client devices 103–105 and servers 110, 112, 116 and 118 may communicate with one another by sending and receiving messages via the network 102.

The network 102 may be any type of network capable of facilitating communication between client and server devices. The network 102 may include a wide area network (WAN), a local area network (LAN), the Internet, a wireless network, a satellite communication network, and the like. Furthermore, the network 102 may include one or more networks of the same or different types. In a preferred embodiment, the network 102 will be considered to be the Internet for illustration purposes.

The client devices 103–105 communicate with one or more of the servers 110, 112, 116 and 118 via the network 102. The client devices 103–105 may be any type of device that is capable of transmitting and receiving messages via the network 102. For example, the client devices 103–105 may be personal computing devices, personal digital assistants (PDAs), wireless telephones, wired telephones, alphanumeric pager devices, and the like.

The servers 110, 112, 116 and 118 are servers to the client devices 103–105 and to others of the servers 110, 112, 116 and 118. In a preferred embodiment, one server operates as a product/services supplier server 110, a second server operates as a location tracking server 112 for tracking the location of one or more client devices, a third server operates as a route determination provider 116 that determines the route to be traveled from a client device's current location to a location where an order is to be completed (hereafter referred to as the completion location), and a fourth server operates as a current traffic information provider 118 for providing information about the current traffic conditions along the route from the current location of the client device to the completion location.

In operation, a user of a client device, such as client device 104, logs onto the supplier server 110 of a supplier of a product/service. In the present invention the product/service is one that includes intermediate points where a current status of the preparation of the product/providing of the service may be reported to a customer. The user of the client device, hereafter referred to as the customer, places an order with the supplier server 110 and thereby initiates a session between the supplier server 110 and the client device 104.

An example mechanism for selecting the supplier server 110 and submitting an order for a product/service is described in the incorporated U.S. patent application Ser. No. 09/788,059. In this mechanism, estimated times of arrival (ETA) for a plurality of suppliers are calculated and provided to a user of a client device in response to the submission of a search query. Based on the ETAs and cost information, a user may select a supplier from which to obtain the product/service and thereby submit an order for the product/service. Of course the present invention is not limited to such a mechanism for selecting a supplier and submitting an order. Any appropriate mechanism may be used without departing from the spirit and scope of the present invention.

Once the user of the client device 104 submits an order to the supplier server 110, the supplier server 110 establishes a session with the client device 104. The session is used as a reference for the order placed by the user and is a mechanism by which the supplier server 110 may direct status update messages to the client device for the particular order.

During the preparation of the product and/or providing of the service ordered (hereafter referred to as the preparation for simplicity), points are established at which a status update may be transmitted to the customer. The points are points during the preparation of the product at which estimated times to completion of the preparation are known. These points may be, for example, transition points at which the preparation operations change. For example, during the preparation of a food item, these points may be the start of the preparation, a point at which the food item is placed in or on a cooking device, a point at which the food item comes out of or off of the cooking device, a point when the food item is packaged, and a point at which the food item is awaiting pickup or delivery.

At these various points, the persons preparing the product may inform the supplier server 110 of the arrival of the preparation of the product at the status update point. For example, a pizza parlor worker that prepares the pizza prior to it being cooked may inform the supplier server 110 for the pizza parlor that he/she has started preparation of the pizza. When the worker hands off the uncooked pizza to another worker for cooking, or when the worker himself places the pizza in the oven, the supplier server 110 may be informed that the pizza has been placed in the oven. These points in the preparation of the pizza essentially provide a current status of the pizza preparation which may be reported back to the customer as a current status update of the customer's order.

The informing of the arrival at a predetermined point in the preparation may be performed in any appropriate manner. For example, bar codes and bar code readers may be provided at various physical locations in the supplier facility at which a change in the preparation occurs. Using the pizza parlor example above, a bar code may be established at the uncooked pizza station, the oven entrance, the oven exit, and a order pickup or delivery location. When a worker receives the incomplete product for the next phase in the preparation, the worker may provide an indicator of the order being worked on, such as by pressing an appropriate button on the bar code reader, and then scan the bar code for the particular preparation station for that phase of the preparation. In this way, the supplier server is kept informed of the current status of the preparation of the product.

Other mechanisms may be used for informing the supplier server of the current status of the preparation of the product without departing from the spirit and scope of the present invention. These mechanisms may range from simply having an employee track the status of the product manually and enter the current status information into a computer terminal to having a sophisticated computing system that automatically tracks the current status of the preparation of the product using some identifier on the product, and automatically reporting the current status to a central supplier server.

The current status information is used to update information associated with the session initiated when the customer's order was placed. In addition, when an update of the current status of the preparation of the product is obtained by the supplier server 110, the supplier server 110 may automatically transmit an update message to the client device 104 via the network 102 to inform the customer of the change in the current status of the preparation.

The update message sent by the supplier server 110 preferably includes an estimate of the time of completion of the preparation of the product and an estimated travel time of the customer to a location for completion of the providing of the product to the customer, hereafter referred to as the completion location. The estimated time of completion may be obtained based on estimated times of the phases of preparation defined by the points described above.

For example, in the pizza parlor example above, it may be determined that preparation of the uncooked pizza takes approximately 3 minutes, cooking of the pizza takes approximately 5 minutes, and boxing of the pizza for pickup or delivery takes 1 minute. Thus, the if the current status of the pizza preparation is that it has just been placed in the oven, the estimated time of completion of the preparation is 6 minutes. However, if the pizza has been in the oven for 3 minutes, the estimated time of completion is 3 minutes.

The travel time is obtained based on location information obtained from the location tracking server 112, the route determination provider 116, and the current traffic information provider 118. The supplier server 104 obtains information from the location tracking server 112 for ascertaining the current location of the client device 104. Such information may include, for example, the geographical coordinates of the client device 104, map coordinates, or the like.

Alternatively, the location tracking server 112 may be eliminated and location information obtained directly from the client device 104. In such an embodiment, for example, the location information may be simply providing the telephone number or address associated with the current location of the client device 104. This telephone number or address may then be looked up automatically in an on-line yellow pages or other type of directory.

Alternatively, in a preferred embodiment, the client device 104 has an associated location determination device, such as a global positioning system (GPS). This location determination device determines the current location of the client device 104 which may then be periodically transmitted to the location tracking server 112, or the supplier server 110 and stored in association with the established session.

The supplier server 110 obtains from the route determination provider 116, an optimal route between the current location of the client device 104 and the completion location, which will typically be either a location associated with the customer or the location of the supplier. The route determination may be based on the current location of the client device 104, as obtained either from the client device 104, the location tracking server 112, or the supplier server 110, and current traffic conditions as identified by the current traffic information provider 118. Such current traffic condition information may include congestion information, detour information, accident information, travel delays at various times of day, weather related traffic delays, and the like. While the current traffic information provider 118, location tracking server 112, and route determination provider 116 are depicted as separate devices coupled to the network 102, these devices may be incorporated with one another, incorporated into the supplier server 110, be directly accessible by the supplier server 110 without having to route through network 102, or the like.

In addition, the supplier server 110 may determine itself, or obtain from the route determination provider 116, an estimated travel time based on the determined route and the current traffic conditions. This estimated travel time may be based on, for example, an average travel speed, an average delay, and the like, based on the current traffic conditions. The incorporated U.S. patent application Ser. No. 09/788, 059 describes one mechanism by which traffic information may be used to determine an estimated travel time. Of course the present invention may make use of any mechanism that uses traffic condition information as a means for estimating a travel time between a starting location and a destination location without departing from the spirit and scope of the present invention.

Based on the time to completion of the preparation of the product based on the current status of the preparation, and the estimated current travel time to the completion location from the customer's current location, the present invention may determine a time when the customer should begin traveling to the completion location. This time when the customer should begin traveling is determined based on a difference between the time to completion and the customer's travel time. Thus, for example, if it will take 10 minutes to complete preparation of the product and it will take approximately 5 minutes for the customer to travel to the completion location, the customer should begin traveling to the completion location in 5 minutes in order to arrive there at the same time that the preparation is complete.

The time for completion, current estimated travel time, and a time at which the customer should begin traveling to the completion location may be provided to the customer in the form of an alert message. The alert message may take many forms including auditory, visual, and the like. The alert may be an instant message sent to the client device, a telephone call initiated to the client device, an electronic mail message, a pager message, or the like. In a preferred embodiment, the alert is an instant message that is output on a display associated with the client device.

If the time for completion is less than the estimated travel time of the customer, an appropriate alert may be sent indicating that the product will be completed prior to when the customer will arrive at the completion location. In some instances, the supplier may choose to charge an additional fee for storing or keeping the completed product until it is picked up by the customer. For example, a supplier may, as an incentive for customers to pickup their products as soon as possible, charge an additional fee for every time increment over the time of completion that the product is not picked up by the customer. For example, a supplier may charge $0.03 for every 5 minutes that the customer delays in picking up the product. An estimate for the additional charge may be provided in the alert along with the other information indicated above.

Thus, the present invention provides a mechanism by which a customer is provided with alerts indicating the current status of the preparation of a product, the estimated time of completion of the preparation of the product, and an estimated time of travel of the customer to a completion location from the customer's current location taking into account current traffic conditions along a route from the customer's current location to the completion location. In addition, the alert may include an estimate of any additional charges that may be applied due to a delay in the customer arrive at the completion location.

While the above description of the present invention assumes that the customer communicates directly with the supplier server 110 using his/her client device 104, the present invention is not limited to such. Rather, the present invention may be provided as a separate service provider system, such as a proxy server, associated with the supplier server 110. For example, in one embodiment, the present invention may be implemented as an electronic marketplace, similar to that described in the incorporated U.S. patent application Ser. No. 09/88,059, through which a customer may place orders with one or more of a plurality of supplier servers 110.

Figure 2:
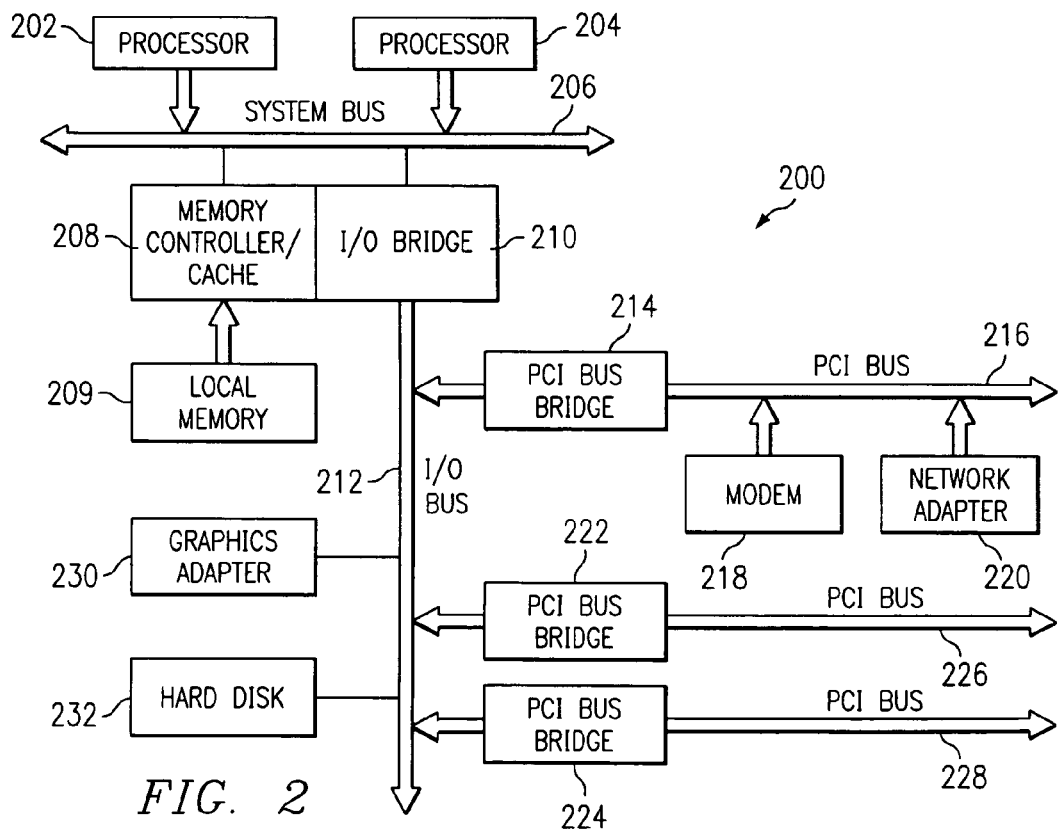
FIG. 2 is an exemplary block diagram illustrating a server device according to one embodiment of the present invention.

Referring to FIG. 2, a block diagram of a data processing system that may be implemented as a server, such as servers 110–118, or a proxy server on which the service provider according to the present invention may be resident, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
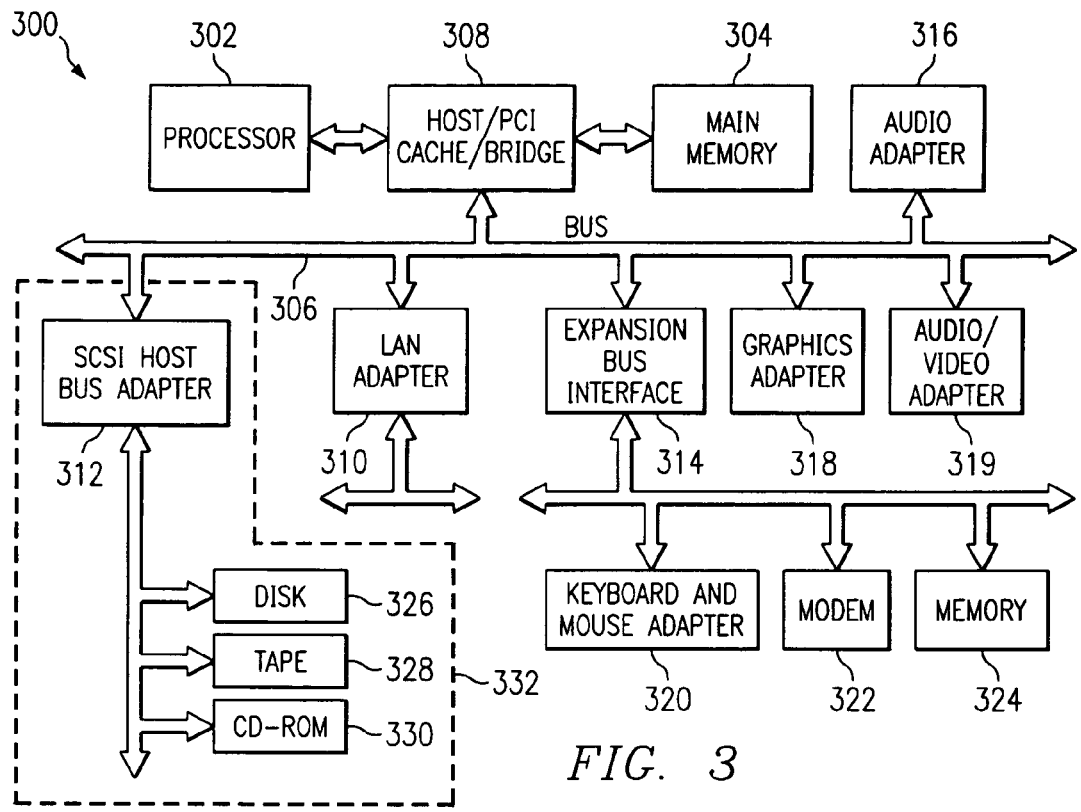
FIG. 3 is an exemplary block diagram illustrating a client device according to one embodiment of the present invention.

With reference now to FIG. 3, a block diagram illustrating a data processing system of a client device is depicted. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
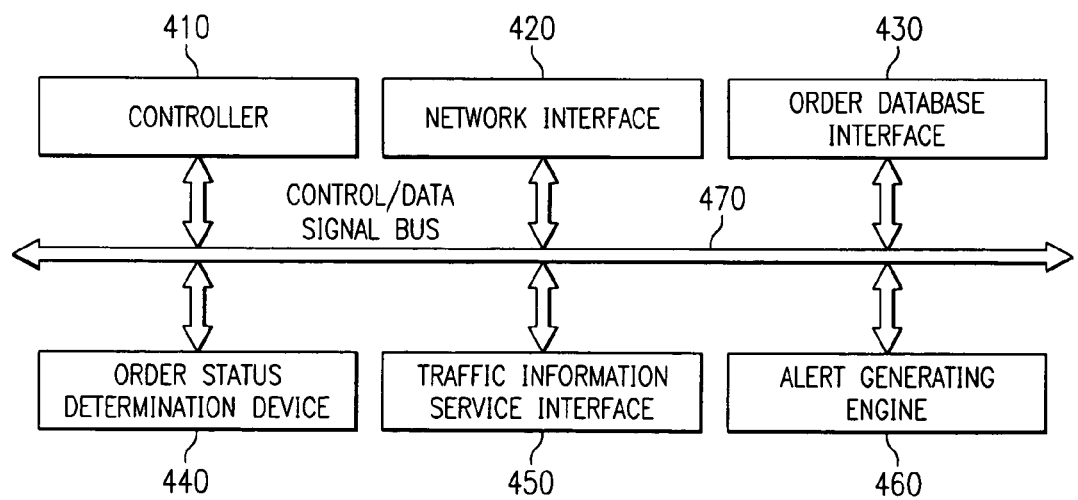
FIG. 4 is an exemplary block diagram of a supplier server according to the present invention.

FIG. 4 is an exemplary block diagram of an alert service provider according to the present invention. The alert service provider shown in FIG. 4 may be a separate entity from the supplier server or may be incorporated therein, as previously mentioned. In a preferred embodiment, the alert service provider is incorporated into a supplier server or computing system that is in communication with network 102.

The elements shown in FIG. 4 may be implemented as hardware, software, or a combination of hardware and software. In a preferred embodiment, the elements in FIG. 4 are implemented as software instructions executed by one or more processors. In addition, while FIG. 4 depicts a bus architecture, the present invention is not limited to such and any architecture that facilitates the communication of control/data signals among the elements may be used without departing from the spirit and scope of the present invention.

As shown in FIG. 4, the alert service provider includes a controller 410, a network interface 420, an order database interface 430, an order status determination device 440, a route determination and traffic information service interface 450 (hereafter referred to as a traffic information service interface 450), and an alert generating engine 460. These elements are coupled to one another via the control/data signal bus 470.

The controller 410 controls the overall operation of the alert service provider and orchestrates the operation of the other elements 420–460. The controller 410 receives an order from a client device via the network interface 420 and initiates a session for the order. The session is stored in the order database 430 along with a current status of the order, a current location of the customer, and a completion location. The order is then provided to the supplier via the network interface 420 so that the order may be processed and the product prepared.

Periodically, the controller 410 may receive status updates for the order from the supplier via the network interface 420. The updates are provided to the order status determination device 440 which determines the current status of the order based on the update message and determines an estimated time to completion of the order. The estimated time of completion may be determined based on historical, average, or predetermined times for completing one or more phases of the preparation of the product. These historical, average, or predetermined times may be stored in association with the order status determination device 440 which retrieves these times based on the updated status of the order and adds the remaining times of the remaining phases in the preparation of the product. This information is then provided to the alert generating engine 460.

In addition, the traffic information service interface 450 obtains route information and estimated travel time information from a route determination device and current traffic information provider based on the current location of the customer and the completion location identified in the session information stored in the order database 430. The traffic information service interface 450 provides the route information and the estimated travel information to the alert generating engine 460.

Based on the current status information, the estimated time to completion of the order, the route information, and the estimated travel time information, the alert generating engine 460 generates an appropriate alert message which is transmitted to the client device identified in the session information via the network interface 420.

Figure 5:
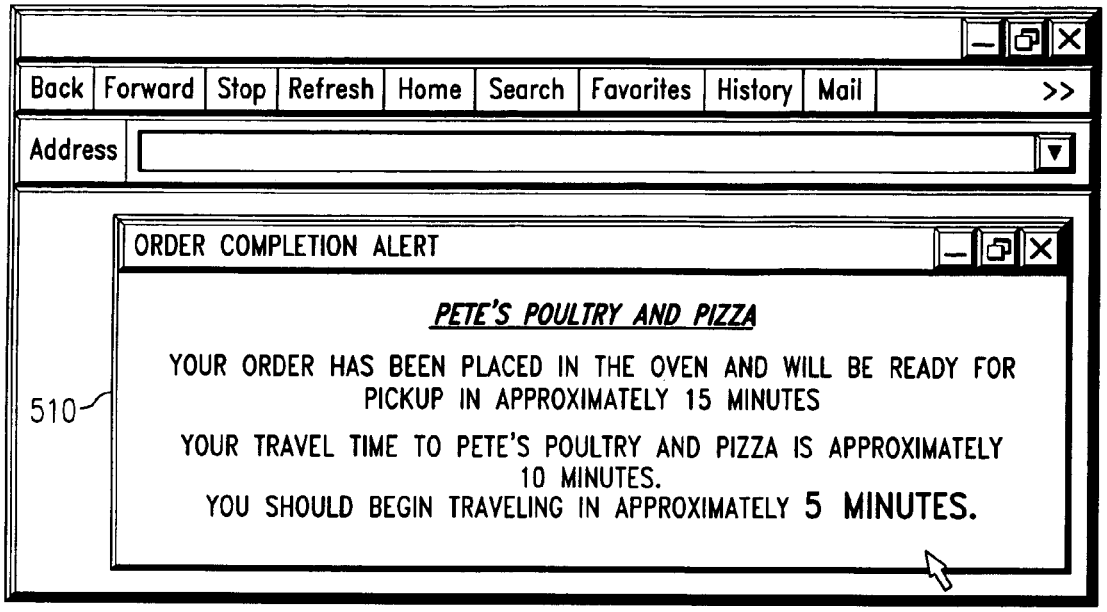
FIG. 5 is an exemplary diagram of an alert message according to the present invention.

FIG. 5 is an exemplary diagram of an alert message according to the present invention. As shown in FIG. 5, the alert message 510 includes a statement as to the current status of the order, an estimated amount of time necessary for completion of the order, an estimated travel time from the customer's current location to the completion location, and an indication of when the customer should begin traveling to the completion location so as to arrive there at the same time that the order is completed. Although not explicitly shown in FIG. 5, the alert message may further include route information informing the customer of the optimum route to be taken to arrive at the completion location.

Figure 6:
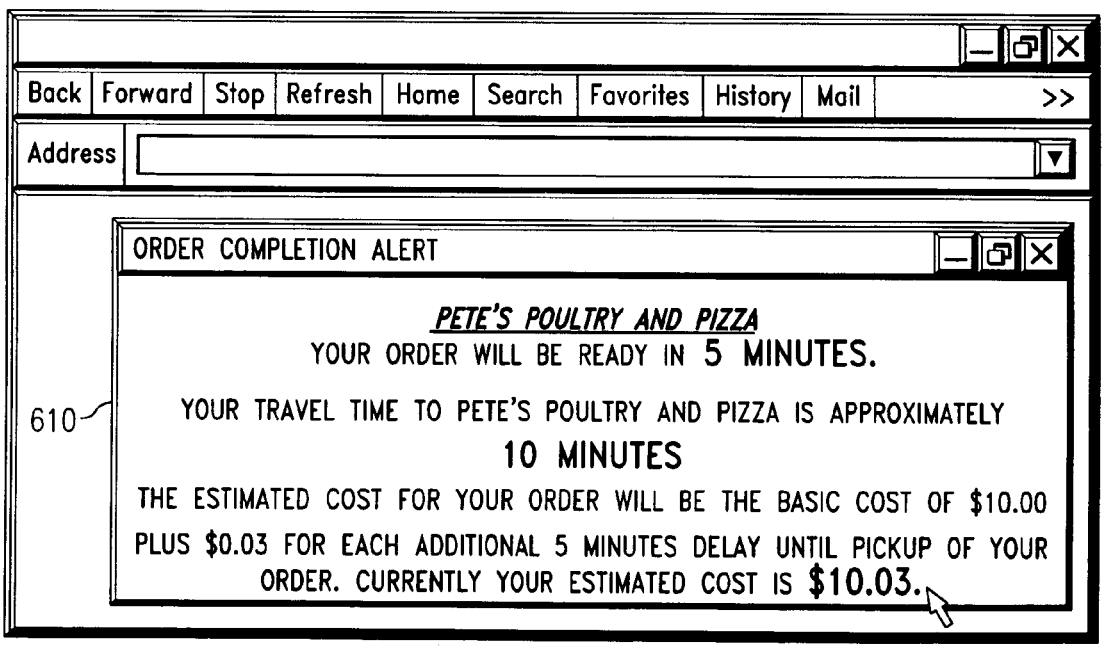
FIG. 6 is an exemplary diagram of an alert message when the time to completion is less than the time of travel for the customer.

FIG. 6 is an exemplary diagram of an alert message according to the present invention when the estimated travel time exceeds the estimated completion time of the order. As shown in FIG. 6, in addition to the information provided in the alert message shown in FIG. 5, the alert message 610 includes an indication of an incremental cost for each time period of delay in picking up the ordered product. In addition, an estimate of the current total charge for the completion of the order may be provided that is a combination of the basic order price as well as any estimated delay charges.

While FIGS. 5 and 6 provide exemplary alert messages for purposes of illustration, the present invention is not limited to these. As previously mentioned, the alert message may take many forms including having audio portions, visual portions, and the like. In addition, different types of information may be provided in the alert message in addition to, or in replacement of, the information shown in FIGS. 5 and 6. As previously mentioned, the alert message may include route information which may include driving directions, a map, and the like, for example.

Figure 7:
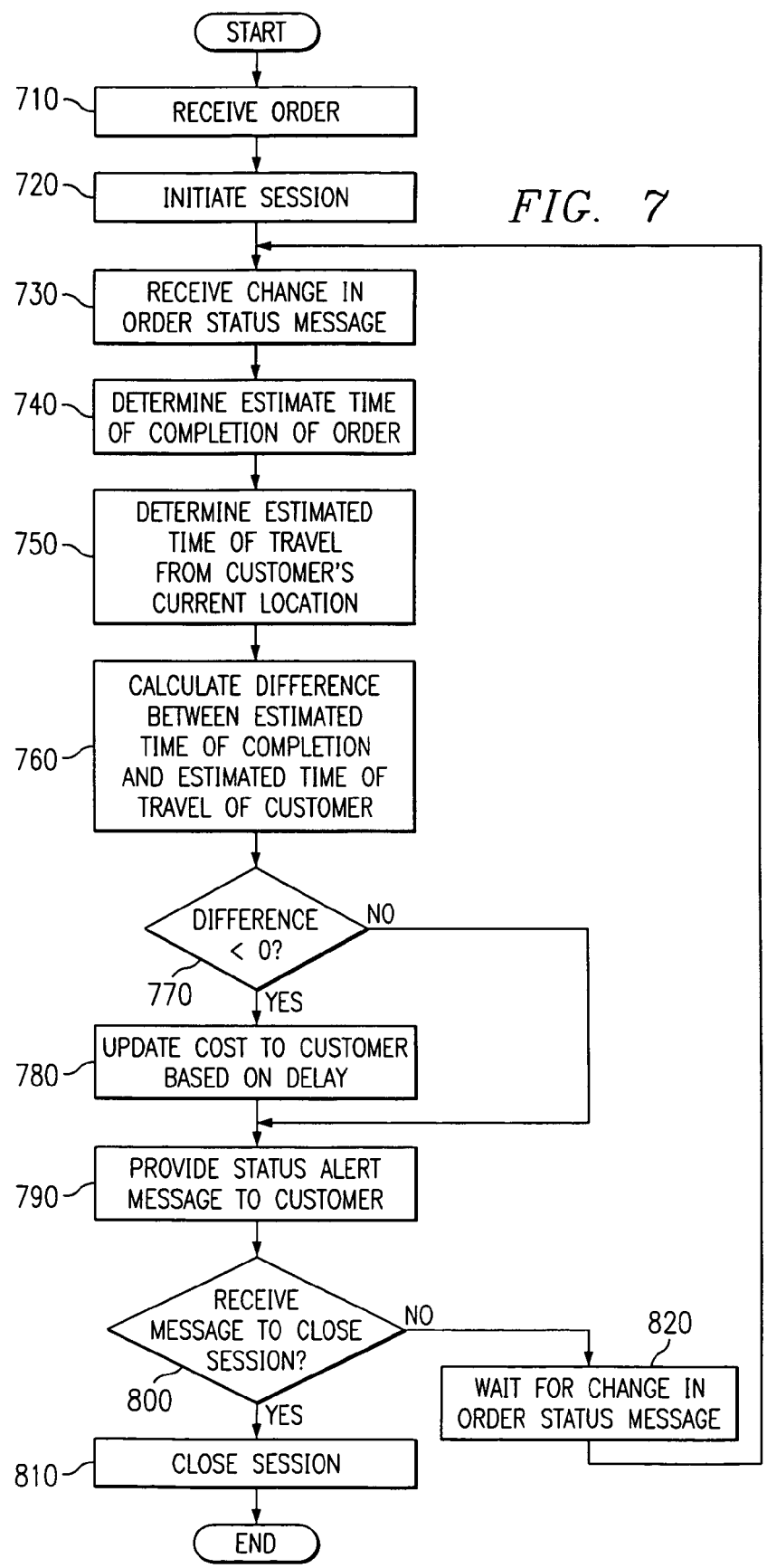
FIG. 7 is a flowchart outlining an exemplary operation of the present invention.

FIG. 7 is a flowchart outlining an exemplary operation of the present invention. As shown in FIG. 7, the operation starts with receipt of an order (step 710). A session is initiated (step 720) and a change in the status of the order is eventually received (step 730). An estimated time of completion of the order based on the new status of the order is determined (step 740) and an estimated time of travel from the customer's current location to the completion location is determined (step 750).

The difference between the two estimated times is calculated (step 760) and a determination is made as to whether the difference is less than zero (step 770). If so, the cost of the completion of the order is updated based on any incremental delay charges associated with the order (step 780). Thereafter, or if the difference is greater than zero, a status alert message is provided to the customer (step 790).

A determination is then made as to whether a close session message is received (step 800). The close session message may be sent by the supplier of the product or service, for example, when the customer picks up or otherwise completes the transaction. If the close session message is received, the session is closed (step 810) and the operation terminates. Otherwise, the operation continues to wait for another change in the order status (step 820) and returns to step 730.

Thus, the present invention provides a mechanism by which customers may be provided with automatic order status updates that indicate when the order is estimated to be completed and how long it will take the customer to travel from their current location to the location where the transaction is to be completed. In addition, the present invention may provide information regarding any incremental changes due to a delay in completion of the transaction.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of alerting customers of a current status of an order, comprising:
   identifying a change in status of the order;
   estimating a time to completion of the order based on the change in status of the order;
   estimating a travel time of the customer;
   transmitting an alert to a client device based on the estimated time to completion of the order and the estimated travel time of the customer;
   wherein transmitting an alert to a client device includes determining a time when the customer should being traveling to a completion location, wherein the alert includes an indication of the time when the customer should begin traveling to the completion location;

wherein the time when the customer should begin traveling to the completion location is a difference between the estimated time to completion of the order and the estimated travel time of the customer; and wherein if the estimated time to completion of the order is less than the estimated travel time of the customer, the alert further includes an indication of an additional charge for delay in completing the order.

2. An apparatus for alerting customers of a current status of an order, comprising:

means for identifying a change in status of the order;

means for estimating a time to completion of the order based on the change in status of the order;

means for estimating a travel time of the customer;

means for transmitting an alert to a client device based on the estimated time to completion of the order and the estimated travel time of the customer;

wherein the means for transmitting an alert to a client device includes means for determining a time when the customer should being traveling to a completion location, and wherein the alert includes an indication of the time when the customer should begin traveling to the completion location;

wherein the time when the customer should begin traveling to the completion location is a difference between the estimated time to completion of the order and the estimated travel time of the customer; and wherein if the estimated time to completion of the order is less than the estimated travel time of the customer, the alert further includes an indication of an additional charge for delay in completing the order.

* * * * *